United States Patent [19]

Holloway et al.

[11] Patent Number: 5,103,547
[45] Date of Patent: Apr. 14, 1992

[54] APPARATUS AND METHOD FOR PLACING WEATHER STRIPPING IN A CHANNEL

[75] Inventors: John S. Holloway, Carlisle; Gary L. Jaehnel, Des Moines, both of Iowa

[73] Assignee: Emco Specialties, Inc., Des Moines, Iowa

[21] Appl. No.: 662,949

[22] Filed: Mar. 1, 1991

[51] Int. Cl.⁵ .............................................. B23P 11/02
[52] U.S. Cl. ........................................ 29/451; 29/235
[58] Field of Search ................. 29/451, 235, 819, 820, 29/429, 430, 779, 782, 787, 789

[56] References Cited

U.S. PATENT DOCUMENTS

| | | | |
|---|---|---|---|
| 4,172,313 | 10/1979 | Takahashi | 29/235 |
| 4,178,673 | 12/1979 | Swanson et al. | 29/235 X |
| 4,528,736 | 7/1985 | Hope et al. | 29/235 |
| 4,843,701 | 7/1989 | St. Angelo et al. | 29/235 |
| 5,031,293 | 7/1991 | Goedderz et al. | 29/235 |

*Primary Examiner*—Joseph M. Gorski
*Assistant Examiner*—S. Thomas Hughes
*Attorney, Agent, or Firm*—Zarley, McKee, Thomte, Voorhees & Sease

[57] ABSTRACT

A machine for placing weather stripping in an elongated C-shaped channel includes a press wheel which is rotatably mounted on a frame, and a plurality of guide wheels for guiding the channel in a longitudinal direction. The weather stripping is partially placed within the channel, and the press wheel forces the weather stripping completely into the channel as the channel is moved longitudinally pass the press wheel.

8 Claims, 2 Drawing Sheets

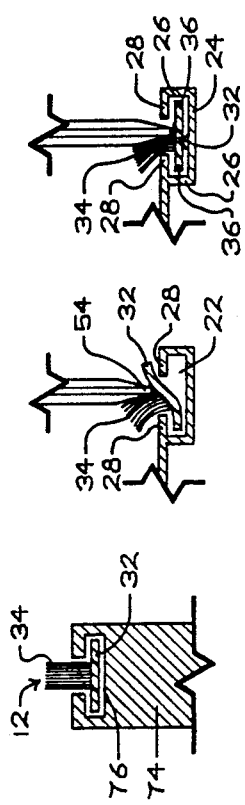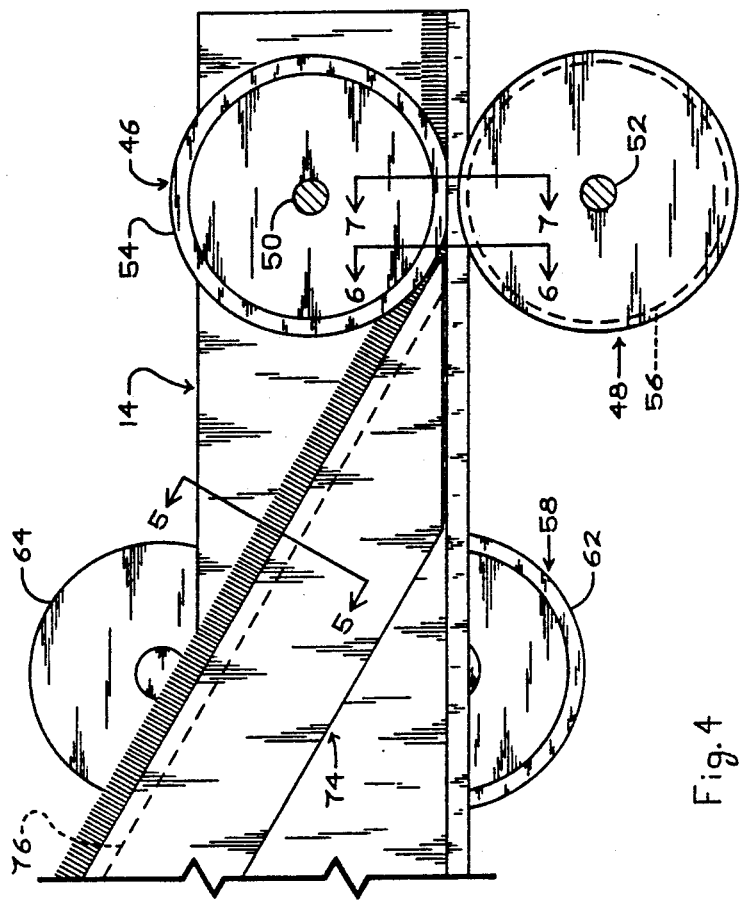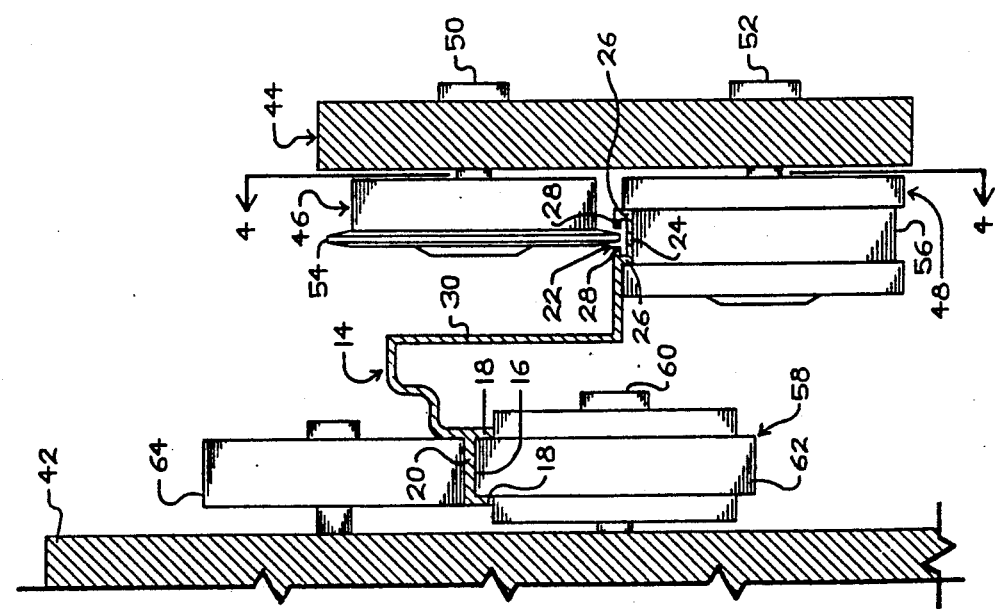

APPARATUS AND METHOD FOR PLACING WEATHER STRIPPING IN A CHANNEL

BACKGROUND OF THE INVENTION

This invention relates to an apparatus and method for placing weather-strip in a channel.

In the construction of aluminum doors and windows, it is desirable to insert an elongated weather stripping in a channel of an aluminum extrusion. Usually this is done by threading the weather stripping in the channel and pulling it along the length of the channel.

However, this is a time consuming process, and is not efficient for mass production.

Therefore, a primary object of the present invention is the provision of an improved apparatus and method for placing weather stripping in a channel.

A further object of the present invention is the provision of an improved apparatus and method which permits the weather stripping to be placed automatically within the channel.

A further object of the present invention is the provision of an apparatus and method which permits the weather stripping to be inserted into the channel much more quickly than with prior art methods.

A further object of the present invention is the provision of an improved apparatus and method which are economical to manufacture, durable in use, and efficient in operation.

SUMMARY OF THE INVENTION

The present invention permits the automatic insertion of a weather stripping material into an elongated C-shaped channel. The weather stripping material includes a flat backing member and a strip of pile or bristle material attached to the upper surface of the backing member and extending upwardly therefrom. The C-shaped channel includes an upwardly presented floor, two opposite side edges, and two inwardly extending lips at the upper ends of the side edges.

The apparatus of the present invention includes a frame having means for supporting the elongated channel in a horizontal position with the bottom wall of the C-shaped channel presented upwardly. One edge of the stripping member is inserted into the channel below one of the lips of the channel, with the other edge of the backing member being outside the channel and above the other lip. The backing member is usually formed from a plastic material which is flexible and capable of bending and deflection.

The apparatus includes a press wheel which is rotatably mounted on the frame and which includes an annular rim which protrudes partially within the C-shaped channel below the lips thereof. The annular rim is placed on top of the backing member. The channel and the backing member are then guided in unison below the annular rim of the press wheel, and the press wheel deflects the configuration of the backing member and forces it into the C-shaped channel so that the backing member is completely within the channel, and the bristles or pile are protruding upwardly from the channel.

A cutting knife is placed immediately downstream from the press wheel, and includes power means such as a solenoid for causing the knife to cut the weather stripping to length after it has been inserted within the channel.

BRIEF DESCRIPTION OF THE DRAWINGS

FIG. 3 is a sectional view showing the arrangement of the press wheel and the guide wheels in relationship to the channel.

FIG. 4 is a sectional view taken along line 4—4 of FIG. 3, and showing the weather stripping material being inserted below the press wheel.

FIG. 5 is a sectional view taken along line 5—5 of FIG. 4.

FIG. 6 is a sectional view taken along line 6—6 of FIG. 4.

FIG. 7 is a sectional view taken along line 7—7 of FIG. 4.

DETAILED DESCRIPTION OF PREFERRED EMBODIMENT

Figure 1:
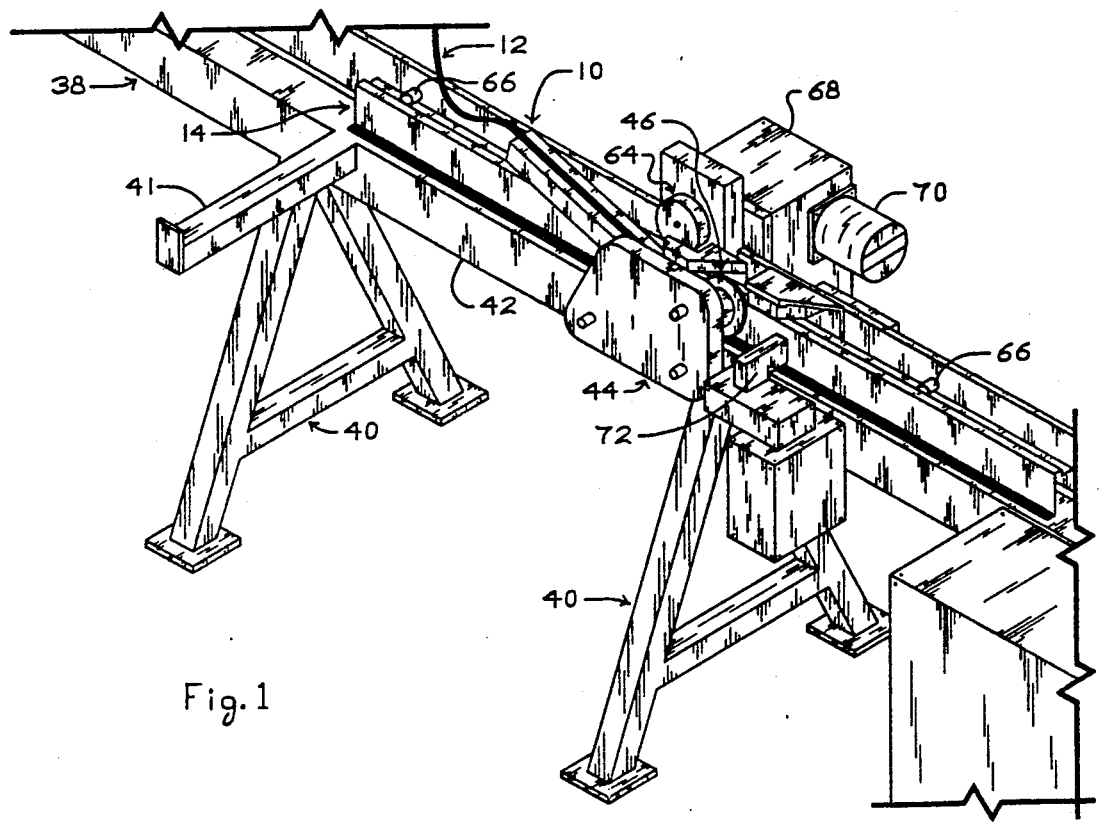
FIG. 1 is a perspective view of the apparatus of the present invention.
Figure 2:
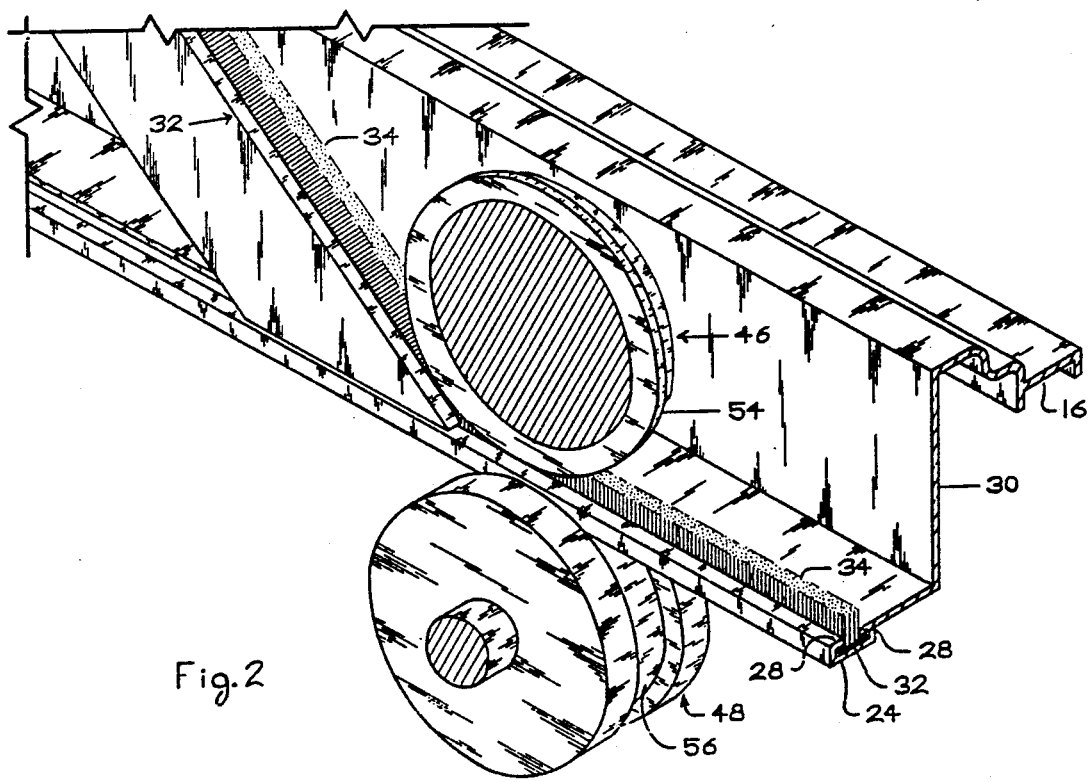
FIG. 2 is a detailed perspective view of the press wheel utilized in the present invention.

Referring to the drawings, the numeral 10 generally designates the pile or weather stripping pulling machine of the present invention. Machine 10 is adapted to attach a weather stripping 12 to an elongated extruded frame member 14.

Frame member 14 includes a downwardly presented channel 16 (FIG. 3) having channel sidewalls 18 interconnected by a web 20. Frame member 14 also includes an upwardly presented stripping channel 22 having a channel floor or web 24 and two opposite sidewalls 26. At the upper ends of sidewalls 26 are a pair of inwardly extending spaced apart lips 28. Interconnecting the stripping channel 22 and the downwardly presented channel 16 is a central body 30 of the frame member 14.

The stripping member is comprised of a flat backing member 32 having an upwardly presented extending piling or bristle portion 34. Backing member 32 includes opposite edges 36. Machine 10 comprises a frame assembly 38 having a pair of supporting legs 40, a pair of rack arms 41 for supporting a plurality of frame members 14, a horizontal frame assembly 42, and a removable frame assembly 44. Rotatably mounted to removable frame assembly 44 are an upper press wheel 46 and a lower idler wheel 48, each of which is rotatably mounted upon an upper shaft 50 and a lower shaft 52 respectively. Press wheel 46 has at its outer edge a sharp annular edge 54. Idler wheel 48 includes around its outer edge an annular groove 56 which is sized to receive the outer edges of the C-shaped stripping channel 22 of frame member 14 as shown in FIG. 3.

Mounted to horizontal frame assembly 42 is a drive wheel 58 which is rotated upon a drive shaft 60 and which includes an annular flange 62 around its outer perimeter. Flange 62 is adapted to be matingly received between the channel sidewalls 18 of downwardly presented channel 16. Thus, the wheel 58 and the wheel 48 support the channel 14 as shown in FIG. 3.

An upper idler wheel 64 is also mounted to horizontal frame 42 and is positioned immediately above drive wheel 58 so as to embrace the upper surface of the web 20 of downwardly presented channel 16 as shown in FIG. 3.

To provide further support for the channel 14, a plurality of roller bearings 66 are positioned on horizontal frame 42 so that the extruded frame member 14 will be supported in a horizontal position and be capable of moving in a direction parallel to the horizontal frame 42.

Mounted to horizontal frame 42 also is a gear box 68 and a motor 70 which are drivingly connected to the drive shaft 60 of drive wheel 58.

A knife 72 is mounted immediately adjacent and downstream the press wheel 46 and includes a knife edge (not shown) which is controlled by a solenoid or other drive means (not shown) for severing the weather stripping after it has been inserted into the channel.

A stripping guide block 74 is also mounted to the horizontal frame 42 and includes an inclined C-shaped guide channel 76 through which the backing member 32 of the weather stripping 12 is threaded (FIG. 5). The lower edge of the inclined guide channel 76 is positioned immediately adjacent and upstream from the lower most edge of press wheel 54.

In operation, the weather stripping is threaded through the C-shaped guide channel 76 of stripping guide block 74. It is then positioned within the C-shaped channel 22 with one edge of backing member 32 below the lips 28 and with the opposite edge of backing member 32 positioned above the opposite lip 28 in the manner shown in FIG. 6.

Next the channel 14 is moved forwardly in the direction from left to right as viewed in FIG. 4 so that the sharp edge 54 of press wheel 46 forces the backing member completely within the channel. As can be seen by a comparison of FIGS. 6 and 7, the flexible and resilient characteristics of the backing member 32 permit it to be deformed so that the press wheel 46 can force it into the C-shaped channel in the manner shown in FIG. 7.

As the elongated extruded member 14 continues to move to the right, the weather stripping is continuously forced into the channel 22 so that the entire channel 22 is filled with weather stripping. After the extruded member 14 is completely filled, the knife 72 is actuated so as to cut off the weather stripping.

In this manner, it is possible to place several extruded members 14 in end to end relationship and feed them continuously through the machine for the application of the weather stripping 12. Photoelectric cells may be placed at strategic points so as to sense when the knife 72 should be actuated.

The present apparatus and method permits the weather stripping to be added quickly to the channel 22 and is considerably faster and more efficient than the method previously used, whereby the stripping member was threaded into the C-shaped channel 22 and then was manually pulled along the entire length thereof. Thus, it can be seen that the device accomplishes at least all of its stated objectives.

We claim:

1. A machine for attaching weather stripping to an elongated member, said weather stripping comprising an elongated flexible flat backing member having opposite side edges spaced apart a pre-determined distance, an upper flat surface, and a lower flat surface, an elongated strip of pile material attached to said upper surface of said backing member, said elongated member having an elongated C-shaped channel extending along the length thereof, said C-shaped channel having in cross section a bottom wall, a pair of opposite sidewalls, and a pair of lips attached to the upper edges of said sidewalls and extending toward one another to terminate in spaced apart lip ends, said sidewalls being spaced apart slightly further than the distance between said side edges of said backing member, and said lips being spaced apart a distance less than said distance between said side edges of said backing member whereby said backing member is capable of fitting within said channel in an installed position with said bottom surface in facing engagement with said bottom wall of said channel and with said strip of pile protruding upwardly between said spaced apart lips, said backing member being yieldably deformable from its flat shape, said machine comprising:

a machine frame;

first guide means on said frame comprising an idler wheel rotatably mounted to said frame about a horizontal axis and having an annular rim engaging said elongated member below said bottom wall of said channel for supporting and guiding said elongated member for rolling movement in a predetermined longitudinal path with said bottom wall of said channel facing upwardly;

second guide means for supporting said weather stripping adjacent said first guide means and for feeding said weather stripping longitudinally along said predetermined path;

a press wheel rotatably mounted on said frame for rotation about a horizontal axis and positioned above said idler wheel adjacent a press station on said predetermined longitudinal path, said press wheel having a circular annular rim having a lower edge protruding within said C-shaped channel below said lips thereof so that said bottom wall of said channel is positioned between said annular rim of said idler wheel and said annular rim of said press wheel;

said second guide means being capable of feeding said weather stripping to a preload position within said channel with one of said edges if said backing member below one of said lips of said channel and with the other of said edges of said backing member above the other of said lips of said channel, whereby movement of said elongated member through said press station with said stripping member in said preloaded position causes said press wheel to engage said backing member of said weather stripping and force said backing member to move completely within said channel below both of said lips.

2. A machine according to claim 1 wherein said first guide means further comprises a drive wheel positioned below said elongated member adjacent said press station, said drive wheel being rotatable to cause said elongated member to move along said predetermined path.

3. A machine according to claim 1 wherein said second guide means comprising an elongated guide member having a guide channel therein, said guide channel having in cross section a bottom wall, a pair of opposite sidewalls, and a pair of lips attached to the upper edges of said sidewalls and extending toward one another to terminate in spaced apart lip ends, said guide channel being capable of containing said backing member of said weather stripping for longitudinal sliding movement therein, said guide channel terminating a discharge end adjacent said press station.

4. A machine according to claim 2 wherein said first guide means further comprises a second idler wheel above said drive wheel and said elongated member so that said elongated member is between and engaged by said drive wheel and said second idler wheel.

5. A machine according to claim 1 wherein said first guide means is free from frictional engagement with said lips and said opposite sidewalls of said C-shaped channel.

6. A machine according to claim 1 wherein said first guide means consists only a plurality of wheels rotatably mounted to said frame and rollably engaging said elongated member for permitting said elongated member to roll thereon.

7. A machine according to claim 1 wherein said first guide means and said press wheel and said frame are stationary and said first guide means causes said elongated member to roll on said first guide means while passing through said press station.

8. A method for attaching weather stripping to an elongated member, said weather stripping comprising an elongated flexible flat backing member having opposite side edges spaced apart a pre-determined distance, an upper flat surface, and a lower flat surface, an elongated strip of pile material attached to said upper surface of said backing member, said elongated member having an elongated C-shaped channel extending along the length thereof, said C-shaped channel having in cross section a bottom wall, a pair of opposite sidewalls, and a pair of lips attached to upper edges of said sidewalls and extending toward one another to terminate in spaced apart lip ends, said sidewalls being spaced apart slightly further than the distance between said side edges of said backing member, and said lips being spaced apart a distance less than said distance between said side edges of said backing member whereby said backing member is capable of fitting within said channel in an installed position with said bottom surface in facing engagement with said bottom wall of said channel and with said strip of pile protruding upwardly between said spaced apart lips, said backing member being yieldably deformable from its flat shape; said method comprising:

using a first guide means comprising an idler wheel positioned below and engaging said bottom wall of said channel to support and guide said elongated member for longitudinal rolling movement on said first guide means in a predetermined path with said bottom wall of said channel facing upwardly;

using a second guide means to feed said weather stripping to a preloaded position registered above said bottom wall of said channel with at least a portion of said backing member of said weather stripping being above said lips of said channel;

using a press wheel located above said idler wheel to engage said backing member while in said preloaded position to force said backing member downwardly to said installed position, said idler wheel preventing downward movement of said C-shaped channel during the time that said press wheel is forcing said backing member downwardly.

* * * * *